Sept. 14, 1926.
P. MAZÉ
1,599,578
BLOWER FOR FUEL BURNERS
Filed June 24, 1924   2 Sheets-Sheet 1
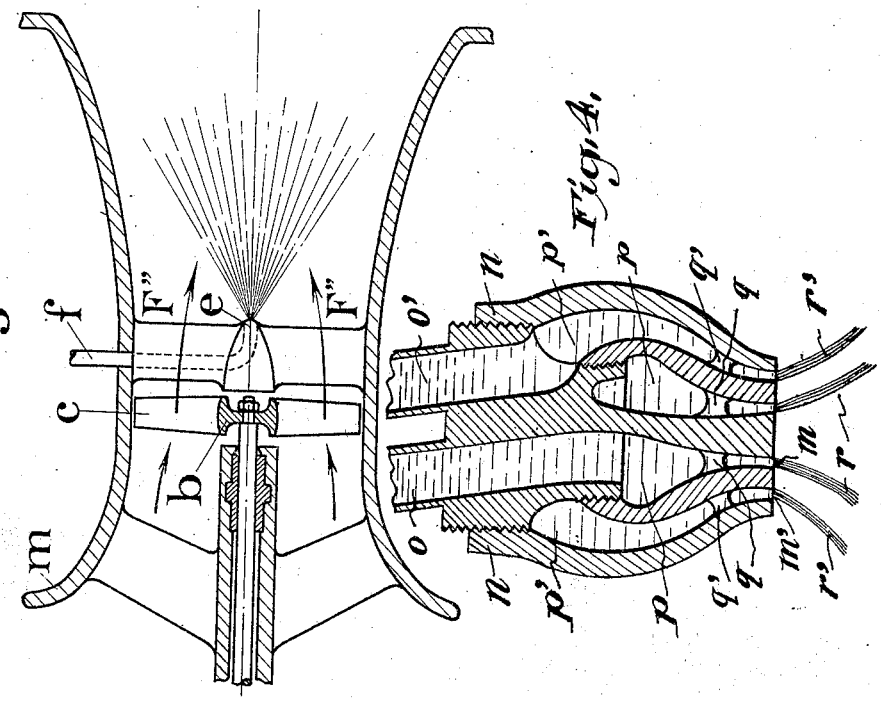
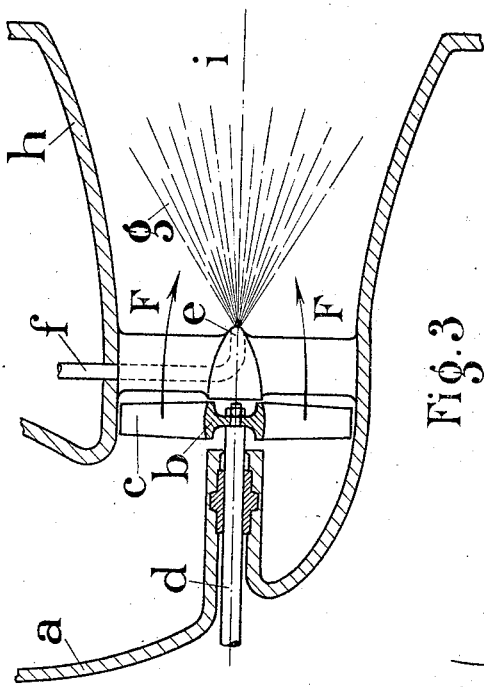
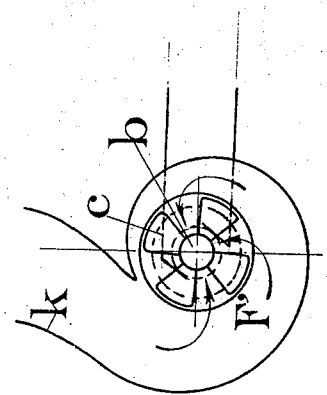
Inventor
P. Mazé
by Marks & Clerk

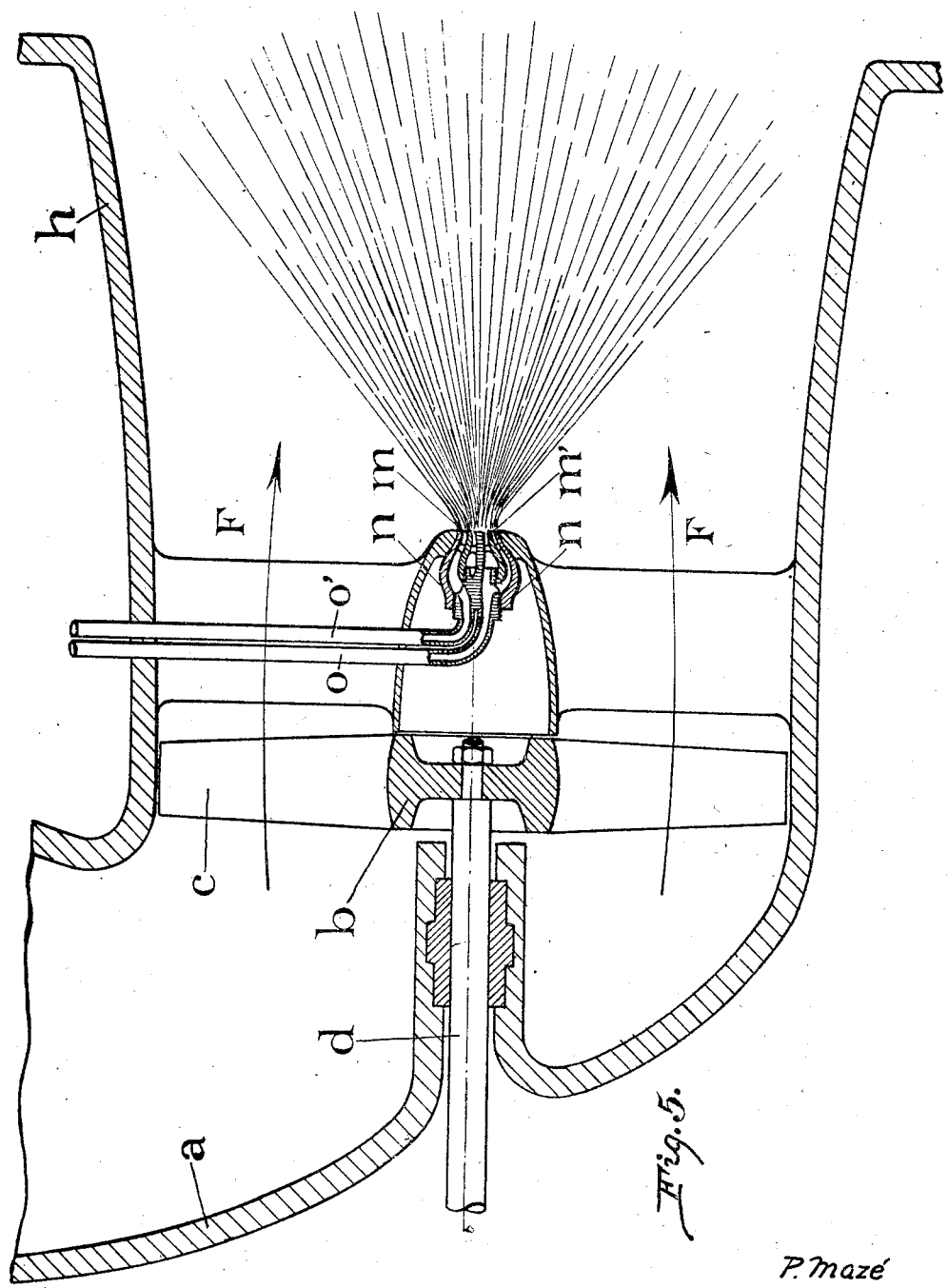

Patented Sept. 14, 1926.

1,599,578

UNITED STATES PATENT OFFICE.

PIERRE MAZÉ, OF PARIS, FRANCE.

BLOWER FOR FUEL BURNERS.

Application filed June 24, 1924, Serial No. 722,138, and in France June 30, 1923.

This invention relates to a blower for fluid or pulverized fuel-burners, and has for its object to provide apparatus of small size and weight and to ensure suitable combustion, with an increased output.

According to this invention a burner is mounted directly on to the air outlet of a fan so as to utilize the agitation produced by the fan rotor for stirring up the air and fuel.

In the accompanying drawings, which illustrate typical embodiments of the invention diagrammatically, Figure 1 is an axial section of a device comprising a fan with a laterally bent intake pipe; Figure 2 is an end elevation of a fan with a helicoidal intake, and Figure 3 is an axial section of a device with a fan having a flared intake, Figure 2 being on a smaller scale than the other figures.

Figure 4 shows a burner with two concentric crowns. Figure 5 is an axial section of a modification.

As shown in Figure 1, a helicoidal fan has an air intake $a$ for atmospheric air, and a rotor $b$ provided with vanes $c$ mounted on a shaft $d$ said shaft being driven by a suitable motor $y$ such as electric, steam, or the like. At the outlet of the fan is arranged a burner $e$ provided with a fuel feed pipe $f$. The whole terminates, in front, in a diffuser $h$, which forms a combustion chamber $i$ in which spreads out a stream of fuel $g$.

The fan draws in air through the intake $a$ and discharges it in the direction of the arrows F, whilst fuel reaching the burner $e$ by way of the pipe $f$ is drawn by the gyratory movement of the air along the stream $g$ while the combustion is proceeding.

The devices hitherto known comprise a fan rotor, a member designed for transforming into pressure the air velocity produced by the rotor; then, after the air has traversed a passage of variable length, a member which retransforms entirely or partly the air pressure into the velocity necessary for the proper working of the burner. In many installations, fixed blades or vanes impart to the air a rapid rotary motion which is favourable to said working. This double transformation, however, entails a loss of energy. In the device of the present invention the fan rotor sets up the velocity and rotary motion of the air without the use of cumbrous members which give only a low efficiency. Moreover, since the combustion takes place at the fan outlet all the vertical and agitating movements set up by the vanes are utilized for stirring the fuel and the flame.

The fan intake may be of any known type. Figure 2 shows for example an intake $k$ coiled in the form of a scroll, like the delivery spiral of a centrifugal pump, the movement of the air being indicated by the arrows F′. In the form shown in Figure 3 the intake consists of a simple flared pipe $m$ which leads the air over the rotor vanes $c$, the flow of air indicated by the arrows F″.

On the other hand the fan rotor may be centrifugal, helico-centrifugal, or of any other type. The burner $e$ may also be of any known pattern.

The invention is applicable to all furnaces in which liquid, gaseous or pulverized fuel is consumed, and in particular for heating marine or locomotive boilers by means of mazout (crude petroleum).

Other spheres of application comprise the combustion of gases especially in furnaces or under boilers. The improved device may also be employed for the combustion of pulverized coal, which is discharged into the air current, either in front or in rear of the fan rotor, through suitably arranged openings. When the fan is driven by steam from the boiler, in connection with the firing of which it is employed, or by a force derived therefrom, it may be useful to provide for getting-up steam, an auxiliary device similar to the one described, but smaller and driven by any other source of power, for example compressed air, an internal-combustion engine, or even by hand.

In certain cases, especially when burning crude oil for marine boilers, it is sometimes an advantage to have a small number of high-capacity burners which are nevertheless able to work on low duty for slow speeds. According to the modified form shown in Figure 4 the burner is arranged to spread out the fuel in one or more hollow cones.

As shown in Figure 4, the burner consists of two fixed coaxial crowns $m$ $m'$ arranged in a casing $n$ and receiving fuel through pipes $o$ $o'$ opening into circular chambers $p$ $p'$.

The fuel issues from the crowns $m$ $m'$ in conical streams $r$ $r'$ which are usually at different angles in order to ensure better admixture with the air. The crowns $m$ $m'$ may be provided with oblique baffles or vanes $q$ $q'$ which impart velocity and a gyratory motion to the fuel.

According as fuel is fed to the inner crown $m$ only, or to the outer crown $m'$ only, or to both together, three different degrees of output may be obtained. Moreover, the number of coaxial crowns may be increased; with three crowns, for example, seven degrees of output can be obtained.

What I claim is:—

1. A blower for fluid or pulverent fuels comprising a Venturi shaped air conduit, a fuel burner arranged in the conduit at the most restricted portion thereof, and a rotary fan arranged in the conduit directly behind the burner and between the burner and the inlet of the conduit, means for rotating said fan, said fan being located in such close proximity to the burner that the air velocity created by the fan and transformed into pressure by the Venturi shaped conduit is caused to agitate and mix the air and fuel.

2. A blower as claimed in claim 1 in which the burner is provided with a plurality of fixed coaxial crowns adapted to spray circular streams of fuel.

In testimony whereof I hereunto affix my signature.

PIERRE MAZÉ.